US 8,995,823 B2

(12) United States Patent
O'Kelly et al.

(10) Patent No.: US 8,995,823 B2
(45) Date of Patent: Mar. 31, 2015

(54) METHOD AND SYSTEM FOR CONTENT RELEVANCE SCORE DETERMINATION

(71) Applicant: HighlightCam, Inc., Mountain View, CA (US)

(72) Inventors: Michael O'Kelly, Mountain View, CA (US); Martin Wicke, Mountain View, CA (US); Michael Katsevman, Mountain View, CA (US); Robert Neivert, Mountain View, CA (US)

(73) Assignee: HighlightCam, Inc., Mountain View, CA (US)

( * ) Notice: Subject to any disclaimer, the term of this patent is extended or adjusted under 35 U.S.C. 154(b) by 23 days.

(21) Appl. No.: 13/929,594

(22) Filed: Jun. 27, 2013

(65) Prior Publication Data
US 2014/0023348 A1    Jan. 23, 2014

Related U.S. Application Data

(60) Provisional application No. 61/672,502, filed on Jul. 17, 2012.

(51) Int. Cl.
*H04N 5/76* (2006.01)
*G11B 27/031* (2006.01)
*G11B 27/28* (2006.01)

(52) U.S. Cl.
CPC ............ *G11B 27/031* (2013.01); *G11B 27/28* (2013.01)
USPC .......................................... 386/278; 386/239

(58) Field of Classification Search
None
See application file for complete search history.

(56) References Cited

U.S. PATENT DOCUMENTS

| | | |
|---|---|---|
| 4,028,496 A | 6/1977 | Lamarche et al. |
| 4,277,645 A | 7/1981 | May, Jr. |
| 4,281,218 A | 7/1981 | Chuang et al. |
| 4,829,578 A | 5/1989 | Roberts |
| 4,987,552 A | 1/1991 | Nakamura |
| 5,179,449 A | 1/1993 | Doi |
| 5,237,648 A | 8/1993 | Mills et al. |
| 5,459,517 A | 10/1995 | Kunitake et al. |
| 5,579,431 A | 11/1996 | Reaves |
| 5,635,982 A | 6/1997 | Zhang et al. |
| 5,642,174 A | 6/1997 | Kazui et al. |
| 5,751,378 A | 5/1998 | Chen et al. |
| 2012/0070016 A1* | 3/2012 | Yonekubo et al. ............ 381/94.1 |
| 2013/0144607 A1* | 6/2013 | Weber ................................. 704/9 |
| 2013/0259123 A1* | 10/2013 | Schweid et al. .......... 375/240.12 |
| 2013/0316744 A1* | 11/2013 | Newham et al. .............. 455/458 |
| 2014/0211859 A1* | 7/2014 | Carmel et al. ............ 375/240.26 |

* cited by examiner

*Primary Examiner* — William C Vaughn, Jr.
*Assistant Examiner* — Eileen Adams
(74) *Attorney, Agent, or Firm* — Law Office of J. Steven Svoboda; J. Steven Svoboda (57) ABSTRACT

A method for editing content, including receiving content from content storage, calculating a score for each frame of the content based on weighted parameter scores, grouping frames into frame groups, calculating a group score for each frame group based on the scores of the frames within the frame group; selecting frame groups having a group score beyond a score threshold, comparing a total length of the selected frame groups to a target length with the system, adjusting the score threshold until the total length of the selected frame groups substantially matches the target length with the system, combining the selected frame groups into a video with the system, and sending the video to a device with the system.

20 Claims, 8 Drawing Sheets

METHOD AND SYSTEM FOR CONTENT RELEVANCE SCORE DETERMINATION

CROSS-REFERENCE TO RELATED APPLICATIONS

This application claims the benefit of U.S. Provisional Application No. 61/672,502 filed Jul. 17, 2012, which is incorporated in its entirety by this reference.

TECHNICAL FIELD

This invention relates generally to the video editing field, and more specifically to a new and useful automatic video editing method and system in the video editing field.

BACKGROUND

When a user attends an event, the user oftentimes desires a memoir of the event, such as a photograph or video of the event highlights. However, users typically do not continuously capture content throughout the entire event, and oftentimes miss the most memorable or relevant portions of the event experience. Furthermore, the content generated by a singular user is not necessarily the content that is the most interesting or relevant to the user.

Thus, there is a need in the video editing field to create a new and useful system and method for generating a summary of event highlights from one or more pieces of event-associated content. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
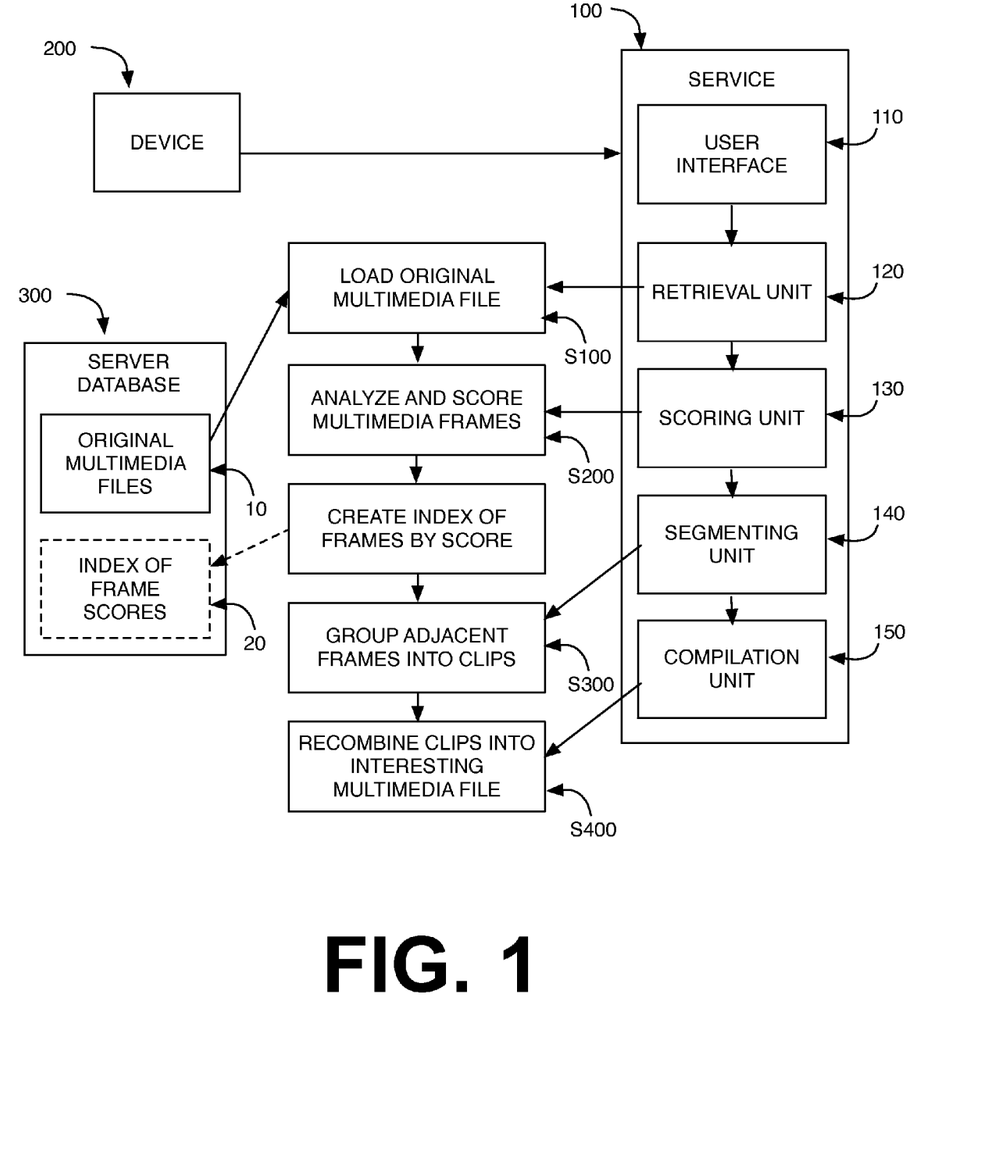
FIG. 1 is a schematic representation of a system and method of editing content.

As shown in FIG. 1, the method of editing content includes calculating a score for each frame of the content S300, grouping the frames into frame groups S200, selecting frame groups to meet a target parameter S300, and combining the selected frame groups into a video S400. The method functions to provide an "interestingness" (relevance) fingerprint for the content. The relevance fingerprint is preferably substantially unique to the content, but can alternatively be shared by different pieces of content. The relevance fingerprint of the content can be used to identify the piece of content, identify related pieces of content, or otherwise used. More preferably, the relevance fingerprint is used to identify the most interesting portions of the content (e.g., frames, scenes, frame groups, etc.), wherein the identified portions are preferably automatically compiled into a multimedia file. When the relevance fingerprint is calculated for a piece of content with respect to the interests of a user, the relevance fingerprint can be used to compile a highlight reel of content that would be most interesting for the user.

The method is preferably performed by a system or service 100 including a user interface 110, a retrieval unit 120, a segmenting unit 130, a scoring unit 140, and a compilation unit 150. The system 100 is preferably a native application installed on the user device 200, but can alternatively be a web-based interface (e.g., browser interface) supported by a networked system of servers and processors, or be any other suitable system. The user interface 110 functions to present and receive information to and from the user, respectively. The user interface 110 is preferably displayed at a display of a user device 200, but can alternatively be an API or other communication stream that interfaces with a user device. The user device 200 can be a mobile device (e.g., smart phone), camera, computer, or any other suitable device. The user device 200 preferably includes a data transfer mechanism, such as transmitter and a receiver configured to transmit and receive data, respectively, a display, an input mechanism (e.g., touchscreen), and a processing unit. The user device 200 can additionally include memory or storage that stores content 10 (original multimedia files). The retrieval unit 120 functions to retrieve content 10 from content storage 300. The content storage 300 can be a remote server or local storage. The retrieval unit 120 can stream, download, or otherwise retrieve the content 10. The segmenting unit 130 functions to segment the content 10 into scenes or frame groups. The segmenting unit 130 preferably segments the content 10 at predetermined intervals, but can alternatively segment the content 10 by clustering techniques, automatic scene detection (e.g., through characteristic parameter determination), or in any other suitable manner. The scoring unit 140 functions to calculate a score for each frame of the content, and can additionally function to calculate a score for each frame group. The scoring unit 140 preferably determines the content parameters to be scored and the weighting for each parameter, but can alternatively determine other aspects of the calculation. The scoring unit 140 preferably determines the group score (scene score) for the frame group using an average of the constituent frame scores, but can alternatively determine the group score using multiplicative combination or any other suitable computation technique. The compilation unit 150 functions to compile select frames or frame groups having a score over a score threshold into a multimedia file 20 (e.g., movie or video). The compilation unit 150 can additionally select the frame groups to be included in the multimedia file 20. The compilation unit 150 preferably selects frame groups having a group score above a score threshold and/or a group length above a length threshold. The compilation unit 150 preferably additionally selects frame groups such that the total duration of the selected frame groups is substantially equal to a target duration. The compilation unit 150 can dynamically adjust the score threshold to filter the qualifying frame groups to achieve the target length. The compilation unit 150 preferably decodes the input video and saves the data of the selected frame groups to the multimedia file 20, but can otherwise compile the selected frame groups into the multimedia file 20.

The content 10 processed by the method is preferably stored on content storage that is remote from the system hosting the service that performs the method, but can alternatively be stored by the host system. For example, the content can be stored on the servers of a social networking service (social networking system), in an online account, on a remote database, or on a different user device (e.g., in a distributed computing system). In another example, the content can be stored on the device performing the method, wherein the content can be generated by or downloaded to the device. The content can be streamed to the system, downloaded by the system, or otherwise obtained. The content is preferably captured by a capturing device, but can alternatively be otherwise generated. The content is preferably image content (e.g., content with a visual component), but can alternatively be pure audio content or any other suitable content. The content can include video (e.g., input video or source video), wherein the video preferably includes one or more video frames and an associated audio signal, still images (e.g., photographs, paintings, graphical renderings, etc.), audio (e.g., voice recordings, acoustic recordings, digitally-generated audio, etc.), text, measurements from the capturing device (e.g., accelerometer, gyroscope, or light data), electronic messages posted on a social networking service that are extracted from a content stream associated with an account of the social networking service, or any other suitable content. The content can additionally include metadata or other associated data, such as user-generated tags, location data, time data (e.g., timestamps), content duration, capturing device data (e.g., gyroscope or accelerometer data), or other suitable data.

The relevance fingerprint, or frame index, can be calculated with respect to a user, a given population, or for a universal audience. The user is preferably represented by or associated with a user account, wherein the method is performed in response to a request received from the user account. The user account can be an account of a social networking service, wherein the content is retrieved from the servers of the social networking service. Alternatively, the user account can be a user profile that is automatically generated from public information (e.g., electronic information accessible to the public from the internet) and/or private information (e.g., electronic information accessible with a password), a user account of a second social networking service separate from the primary social networking service, or any other suitable user account. The population is preferably characterized by a profile or identity including a set of keywords. The set of keywords preferably determines the weighting of variables in content frame and/or group scoring, wherein variables related to keywords within the profile are preferably weighted higher than variables that are not related to profile keywords.

The content 10 used to compile the multimedia file 20 can be limited to content generated by a single user. Alternatively, the content can be limited to content generated by the user and social network connections, as determined from the accounts connected to the user account on a social networking service, up to a predetermined degree of separation (number of connections separating the account in question from the user account). Alternatively, the content can be any content from any suitable source. For example, content from the user, from the user connections, and from the associated press can all be considered in the compilation of the multimedia file.

Figure 2:
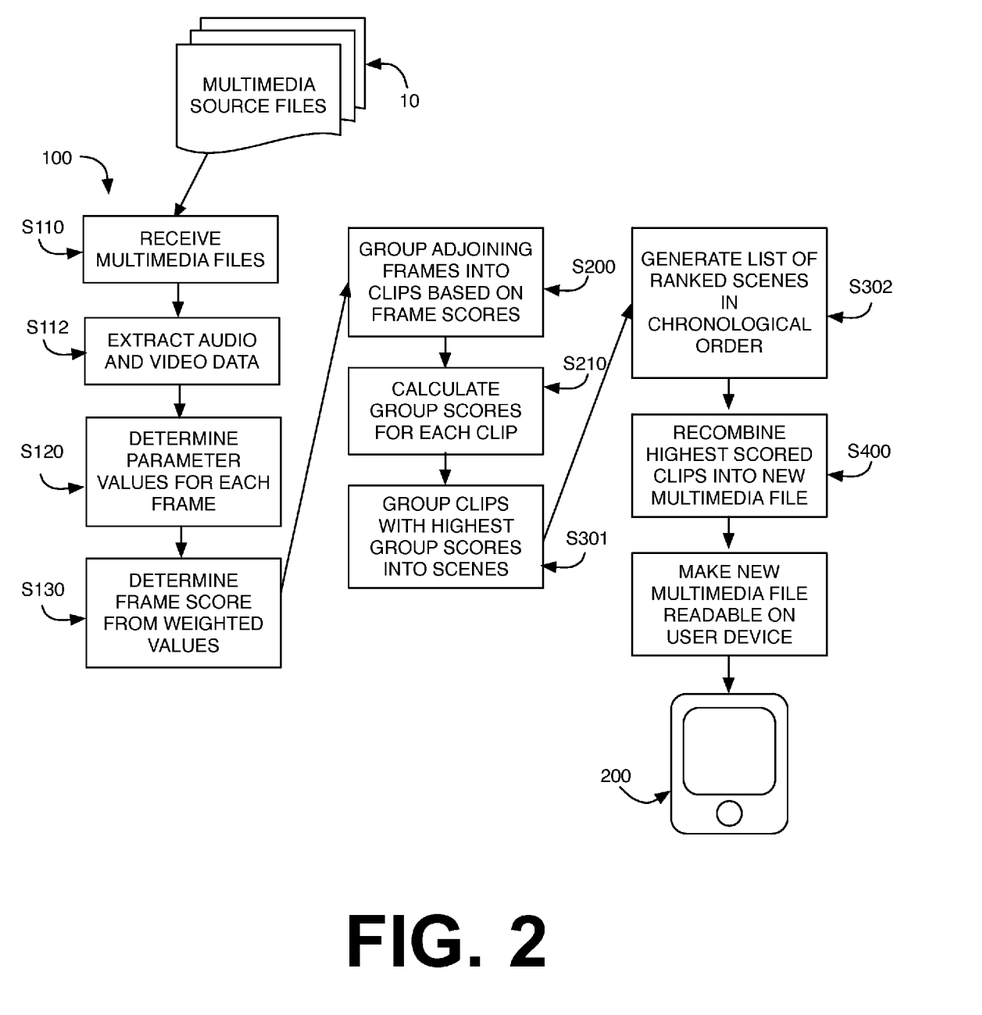
FIG. 2 is a schematic representation of a variation of the method of editing content.

As shown in FIG. 1, calculating a score for each frame of the content S100 functions to estimate how interesting the frame would be to the target population. Calculating a score for each frame also determines the relevance fingerprint for the piece of content, wherein the relevance fingerprint is preferably the pattern of frame scores over the duration of the content. Calculating a frame score preferably includes determining (e.g., calculated, selected, etc.) parameter values for each frame for one or more content parameters S120, as shown in FIG. 2. The content parameter is preferably a frame parameter, but can alternatively be a location parameter, time parameter, content rank, content type, or any other suitable parameter of the content. The frame score can be determined from the occurrence frequency of the content parameter within the frame, the value of the content parameter, a difference between the content parameter value and a target value (e.g., a target date or target location), or be any other suitable measured, extrapolated, or assigned value. The frame score is preferably determined from information contained or directly associated with the frame of interest, but can be determined from information contained or associated with frames adjoining (preceding or succeeding) the frame of interest. The number of preceding or succeeding frames that are considered can be predetermined based on a determined theme or event category, or dynamically adjusted based on the determined content parameter values.

Calculating a frame score preferably includes determining the frame score from weighted values for the one or more content parameters S130 (e.g., as shown in FIG. 2). The weight for each parameter is preferably set in response to a user selection (e.g., of the parameter, of an event type, etc.), but can alternatively be set without user input (e.g., a default weight, weights determined by historical user preferences, etc.). In one variation of the method, a predetermined set of parameter weights can be used in response to a theme selection from the user. In one specific example, object motion between frames can be weighted higher than the number of faces appearing in the frames when a "sports" theme is selected. In another variation of the method, the weight for a given content parameter can be increased in response to a content parameter selection from the user. In a specific example, when the user selects a subject (e.g., a social network connection, animal, cake, etc.), the weight for the subject value can be increased. In another variation of the method, a predetermined set of parameter weights can be used in response to an event type categorization for the content. In a specific example, the weight for the presence of a cake can be increased when the content is determined to be a birthday party.

The parameters for which values can be determined include image parameters, audio parameters, motion parameters, or any other suitable parameter. The content analysis process uses features of the content audio and video and does not require the presence of artificial codes or watermarks. For example, the image and/or audio parameter values are preferably determined from visual and/or audio signals within the range of human detection, but can alternatively or additionally be determined based on signals outside the range of human detection, such as the inclusion of an audio frequency outside the aural frequency range.

The parameter values preferably vary according to pre-set parameter preferences, which could be automatically determined or set by a user. For example, if the pre-set preferences indicate that frames with more faces are more desirable than frames with less faces, then the value for faces will vary directly with the number of faces within the frame. Conversely, if the pre-set preferences indicate that frames with less faces are more desirable than frames with more faces, then the value for faces will vary inversely with the number of faces within the frame.

The frame score can be based on a comparison between the frame of interest and an adjacent frame. The adjacent frame can be a chronologically preceding or succeeding frame. The comparison between frames can include analyzing the frame images for object movement, object differences, object recognition, camera movement, frame blurriness, or any other suitable parameter. The comparison between frames can additionally include determining the amount of noise in the audio signal associated with the frame of interest, the presence of a voice in the audio signal associated with the frame of interest, or any other suitable parameter that can be extracted from the audio signal. The frame comparison values are preferably used when the content is a video, but can alternatively be used for other content.

The frame score can be determined based image parameter values S140. Image parameters for which values can be determined include subject parameters, light parameters, focus parameters, or any other suitable measurable parameter of an image. Subject parameters can include the number of occurrences of a subject type within the image (e.g., the number of faces within the image, number of human forms within the image, etc.), the presence of a specified subject (subject of interest) within the image, the size of the subject within the image, the number of pixels occupied by the subject within the image, or any other suitable measurable parameter of the image associated with a subject. Examples of subjects include faces (e.g., human, dog, etc.), forms or profiles (e.g., human body, a human leg, etc.), and objects (e.g., a ball, cake, etc.). The subject parameter can be any node within a hierarchical tree. For example, the subject can be faces (e.g., any face, or faces in general), or a specific face of interest (e.g., of a specified social connection). Light parameters can include brightness, light intensity distribution over the image, color distribution, or any other suitable measureable parameter of the image associated with light. Focus parameters can include the focus, or conversely, blurriness, of the overall image, the subject of interest, or any other suitable measurement of image resolution. Focus parameter values can be based on spatial resolution, pixel resolution, spectral resolution, or any other suitable resolution measurement. In one variation of the method, the focus parameter value (focus score) can be the number of pixels having a discrete derivative in either the x or y direction that is greater than a predetermined threshold. However, the focus score can be otherwise determined.

Figure 3:
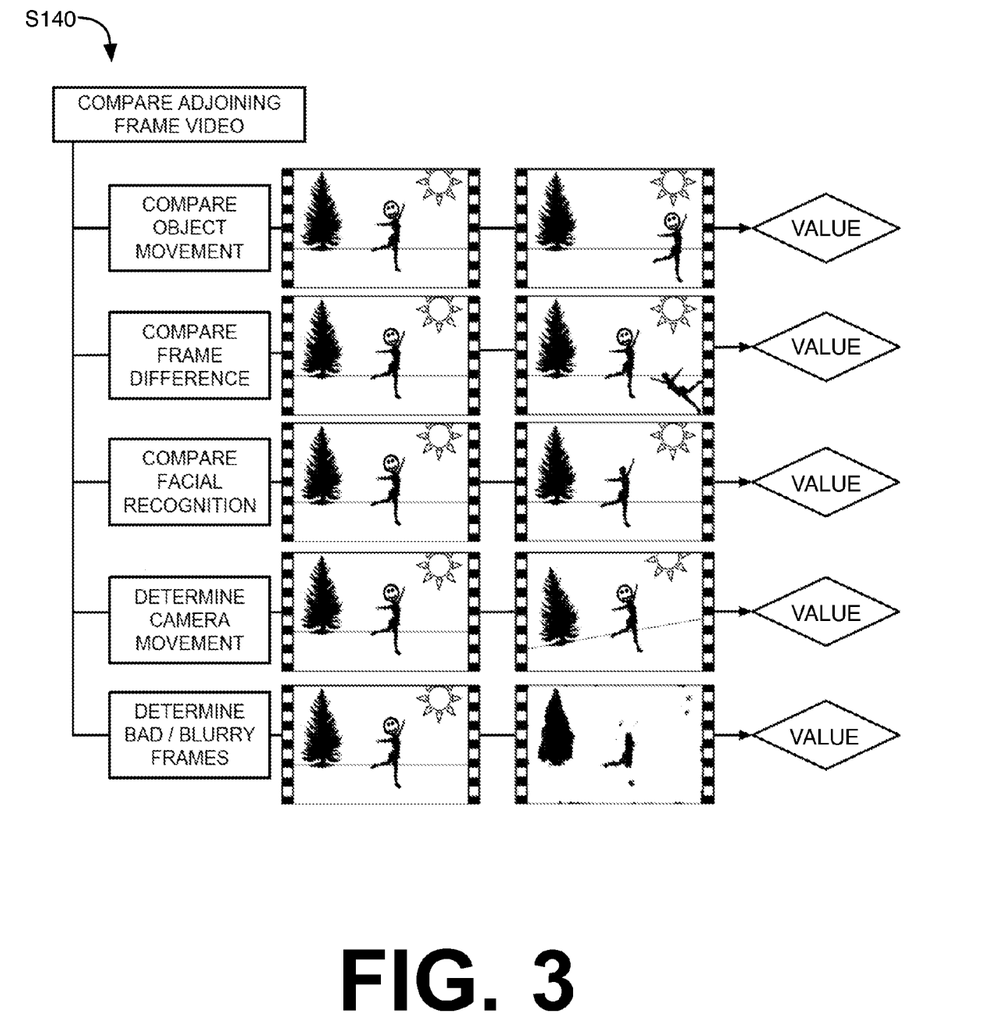
FIG. 3 is a schematic representation of determining image parameter values.

The image parameter value can be determined from motion analysis, as shown in FIG. 3. Object motion or camera motion values are preferably determined from motion fields, wherein motion fields preferably encode how much each pixel or pixel group moves from one frame to the next. Motion values can be additionally or alternatively determined from associated capturing device data, such as accelerometer or gyroscope data, or determined in any other suitable manner. Motion fields can be determined using sparse or dense optical flow methods. Motion fields can be additionally or alternatively extracted from the video, as the video encoder computes motion estimators as part of the compression algorithm. Motion parameters that can be extracted from the motion field include the total motion of the frame (e.g., total change between the current frame and the preceding frame), the amount of camera translation (e.g., parallel translation, perpendicular translation, translation at a given angle, etc.), the amount of camera rotation, the amount of camera zoom (e.g., change in image plane), or any other suitable motion parameter. In one variation of the method, the estimated object motion is preferably adjusted by the estimated camera motion. The object motion can additionally be corrected for outliers to account for image regions having motion that is independent of the camera (e.g., leaves waving in the wind).

Figure 4:
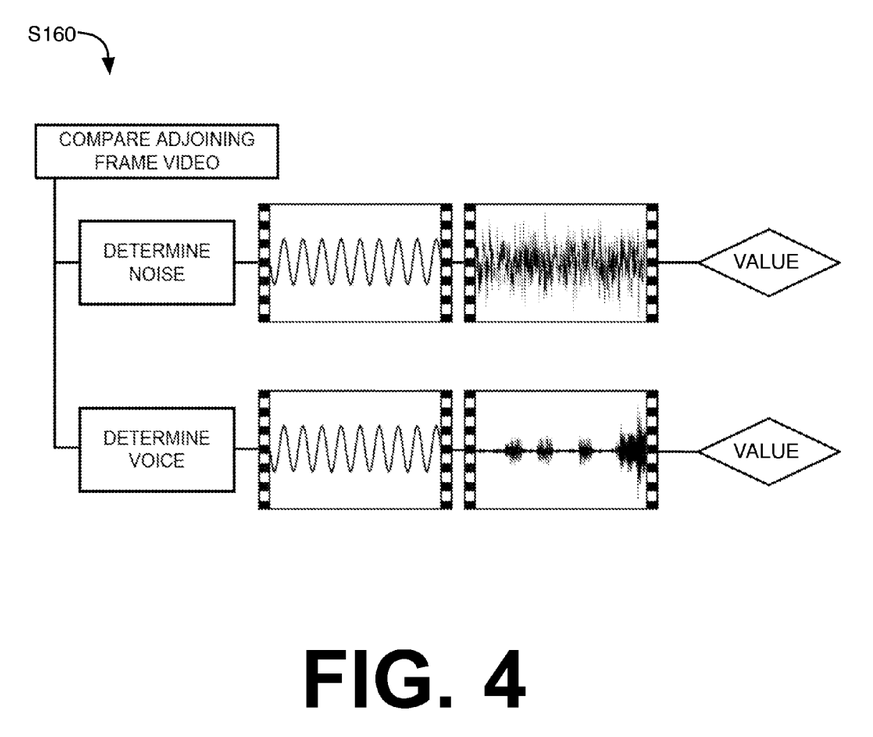
FIG. 4 is a schematic representation of determining audio parameter values.

The frame score can be determined based on the audio signal associated with the frame S160. The audio signal associated with the frame is preferably the audio clip from the same piece of content that shares a timecode with the frame. However, the audio signal can be an audio signal from a different piece of content that has the same timestamp as the frame or an audio signal that is associated with the frame using any other suitable correlating methodology. As shown in FIG. 4, audio parameters for which values can be determined can include the signal-to-noise ratio, short-term energy level, zero-crossing rate, frequency, amplitude, or any other suitable parameter of the audio signal. The values can additionally or alternatively be determined from the variance of these audio parameters within the audio signal segment associated with the frame. The values can be additionally or alternatively determined from the difference in these audio parameters between the audio signals of the frames preceding and/or succeeding the frame of interest. The audio score can additionally be based on a presence, intensity, variance, or other derivatory measure of an audio signal or audio pattern of interest (e.g., a human voice, singing vs. speaking, barking, etc.).

The frame score can additionally be based on a location parameter value. The location parameter is preferably the difference between a location associated with the frame and a target location. The location score preferably varies inversely (e.g., linearly, logarithmically, exponentially, etc.) with distance from the target location, but can vary in any suitable manner with the distance. The location associated with the frame can be determined from a location tag (e.g., for the frame or for the content), from image analysis (e.g., image matching), from audio analysis (e.g., audio pattern detection and/or matching), a combination thereof, or from any other suitable content parameter analysis. The location tag can be latitude and longitude coordinates (e.g., from a GPS), a venue name (e.g., Starbucks), a geographical area identifier (e.g., a city name, state name, etc.), a combination thereof, or any other suitable tag. The target location can be a location associated with the determined event (e.g., location associated with the event on an online database), a user-entered location, or a location determined in any other suitable manner.

The frame score can additionally be based on time parameter values. The time parameter is preferably the difference between a time associated with the frame (timestamp) and a target time. The time value preferably varies inversely (e.g., linearly, logarithmically, exponentially, etc.) with distance from the target time, but can vary in any suitable manner with the amount of time between the timestamp and the target time. The time associated with the frame can be determined from an absolute timestamp (e.g., assigned to the frame or the content), a time code (e.g., for frame within the media, such as 0:30 seconds), from image analysis and matching (e.g., identify an image using image matching and assigning the time associated with the matched image to the frame being scored), from audio analysis and matching, a combination thereof, or from any other suitable content parameter analysis. The target time can be a time associated with the determined event (e.g., hours and date associated with the event on an online database), a user-entered time, the time at which the user request for the multimedia file was received, or a time determined in any other suitable manner.

The frame score can be based on a content rank or relevance score. This is preferably used when the multimedia file is compiled from multiple pieces of content generated by different parties. Each piece of content can be assigned a rank relative to other pieces of content based on one or more file parameters. Alternatively, a score can be calculated for each piece of content based on one or more file parameters. The content score or rank can be included in the frame score (e.g., as a weighted variable), or can be used to select the content to be considered for frame scoring. The file parameters with which the content rank or relevance score is determined can include the relationship of the user with the author, proximity of the content location with the target location, proximity of the content timestamp with target time, keywords with which the content is tagged, the content popularity (e.g., number of views), or any other suitable parameter of the content. The relationship of the user with the content author is preferably determined from the relationship between the respective accounts (e.g., on a social networking system), but can be otherwise determined. The content ranking or score is preferably proportional to the closeness of the relationship, as determined from the degrees of separation between the two accounts, the type of the relationship (e.g., following, two-way relationship, etc.), the type of social networking service (e.g., higher score if connected through Facebook, lower score if connected through LinkedIn), the quality of the communication between the two accounts (e.g., frequency, positive or negative overtones, etc.), the degree of overlap in interests or calculated persona, or any other suitable metric by which the relationship can be quantified.

The frame score can be based on the content type, wherein different types of content are preferably assigned different values. The values are preferably assigned in proportion to predetermined content type preferences. For example, an image (e.g., photograph) can be preferred, and thus scored higher, than a video clip. The content type preferences can be automatically determined by the system or determined from a user selection of the content type. The system can automatically determine the content type preferences from default settings, from stored user preferences, from historical user responses, or determine the content type preferences in any other suitable manner.

Figure 5:
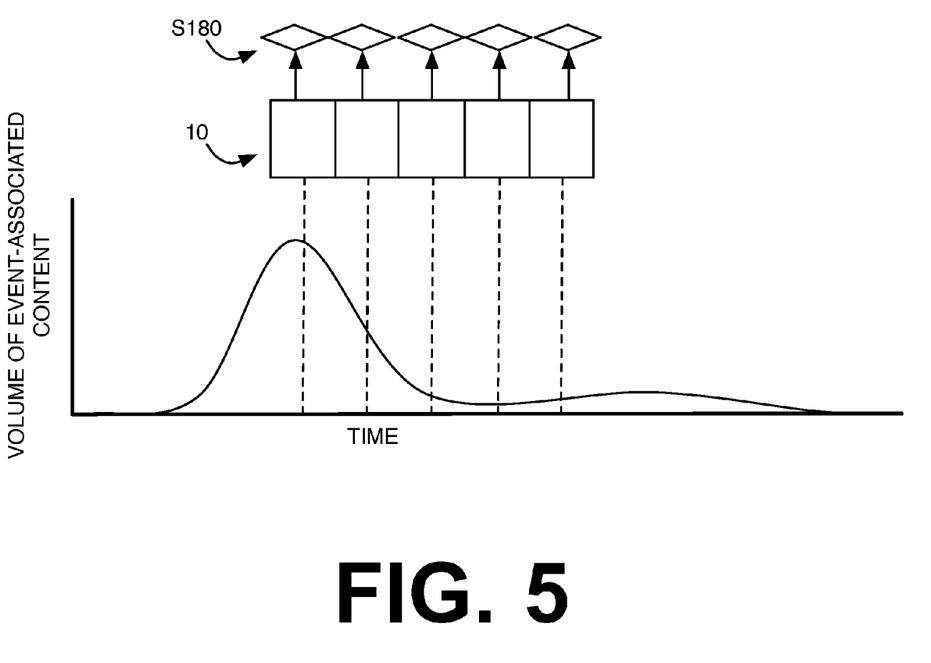
FIG. 5 is a schematic representation of determining a frame score based on the volume of concurrently generated content.

The frame score can be based on the volume of content associated with the frame. In one variation of the method, the frame score can be based on the volume of content generated about the frame. The content generated about the frame can include content (e.g., comments, tweets, etc.) tagged with the frame timestamp, content tagged with the frame timecode, content associated with the source content that was posted at the time the frame was played (e.g., based on text, audio, and image analysis), or any other suitable type of content generated about the frame of interest. In another variation of the method, the frame score can be based on the volume of other content generated about the event that is captured in the piece of content being analyzed. More preferably, the frame score is calculated based on the volume of content generated about the event segment that is captured in the analyzed frames S180 (e.g., determining the frame score based on the volume of concurrently generated content), as shown in FIG. 5. The volume of content can be limited to the volume of primary content associated with the event that can be incorporated into the multimedia file, such as images and video. Alternatively, the volume of content can include or be limited to the volume of secondary content associated with the event, such as tweets or posts to social networking services. A frame is preferably associated with a volume of content through a timestamp or sequence of characters or encoded information identifying when a certain event occurred. In other words, the timestamp of the event segment captured by the frame is preferably determined or estimated, and the volume of content that refers to the captured event is determined and associated with the frame. The timestamp of the event segment can be determined through the content timestamp and the timecode of the frame, through correlation with other pieces of timestamped content that capture the same event segment, or through any other suitable means. Secondary content that is associated with the event (e.g., through a tag) and generated a predetermined duration after the occurrence of the segment of interest can be assumed to refer to the segment of interest. Since content generation typically lags behind the occurrence of an event segment, the secondary content association with the event segment is preferably time-shifted backward, such that the volume of secondary content generation is associated with a timestamp before the time of secondary content posting. The amount of time by which the timestamp is shifted is preferably predetermined (e.g., tweets are assumed to refer to events occurring 30 seconds before the tweet timestamp), but can be empirically determined. Alternatively, secondary content association with the event segment can be determined through metadata, text, image, or audio analysis. In one specific example, a basketball player breaks a leg in a frame. The frame is determined to be associated with a first timestamp. The volume of tweets at a second timestamp occurring a predetermined duration after the first timestamp and tagged with the basketball game or with the basketball player name is assumed to refer to the basketball player breaking his leg. The frame score for the frame is preferably calculated based on the volume of tweets generated at the second timestamp. The frame score can additionally be based on the duration of high-volume secondary content generation about the event. The secondary content posted after the second timestamp can be analyzed for relevance to the event segment. Alternatively, the frame score can be calculated based on the duration for which the increased volume of secondary content generation is sustained. The frame score can additionally be based on the sentiment (e.g., positive or negative) of the other content. For example, frames corresponding to more secondary content having positive sentiment can be scored higher than frames corresponding to more secondary content having negative sentiment.

The frame score can be based on the number of concurrently captured frames of the same event. The concurrently captured frames are preferably frames from different pieces of content. The concurrently captured frames can be of the same subject, and have the same or a different capture angle. Alternatively, the captured frames can be of different subjects (e.g., of different parts of the same event). Concurrent frames can be frames having the same or similar absolute timestamp, wherein the frame timestamp can be determined or estimated. Concurrent frames can alternatively be frames having similar or matching frame data. For example, concurrent frames can be frames with matching images, matching audio signals, matching colors, matching subjects, or any other suitable matching frame data parameter. A combination of parameters, such as timestamp, location, and frame data, is preferably used to determine whether a first and second frame from a first and second piece of content, respectively, are concurrent frames. The frame score preferably varies directly with the number of concurrent frames, but can alternatively vary inversely, or vary in any suitable manner. The frame score can be based on the number of concurrent frames, or be based on a variable calculated from the number of concurrent frames, such as the occurrence frequency of frames capturing an aspect of the event at a given time.

The frame score can additionally be based on the frame scores of the concurrent frames. Alternatively, the frame score for concurrent frames can be used to determine whether the frame or frame group to which the frame belongs should be included in the multimedia file. For example, if two frame groups being considered for inclusion have equal group scores, the frame group having frames with the higher-scored concurrent frames is preferably included, all other parameters being equal. However, the frame scores for concurrent frames can otherwise influence frame inclusion in the multimedia file.

Figure 6:
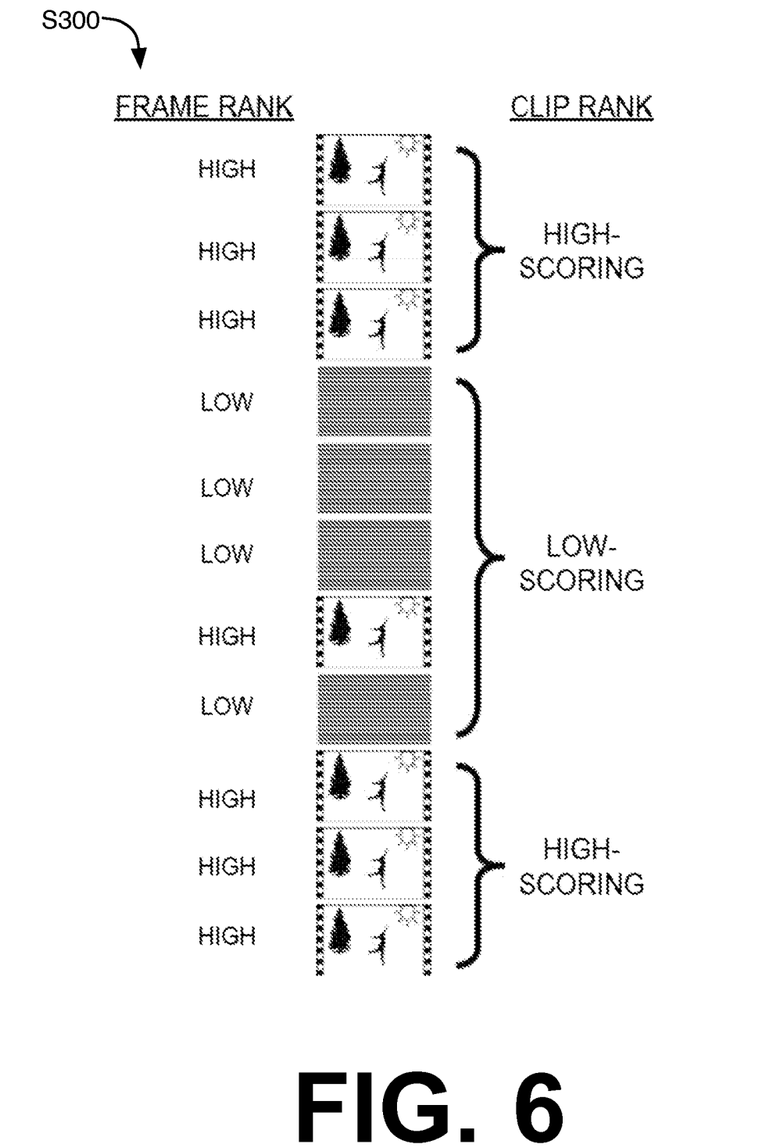
FIG. 6 is a schematic representation of grouping frames into frame groups.
Figure 7:
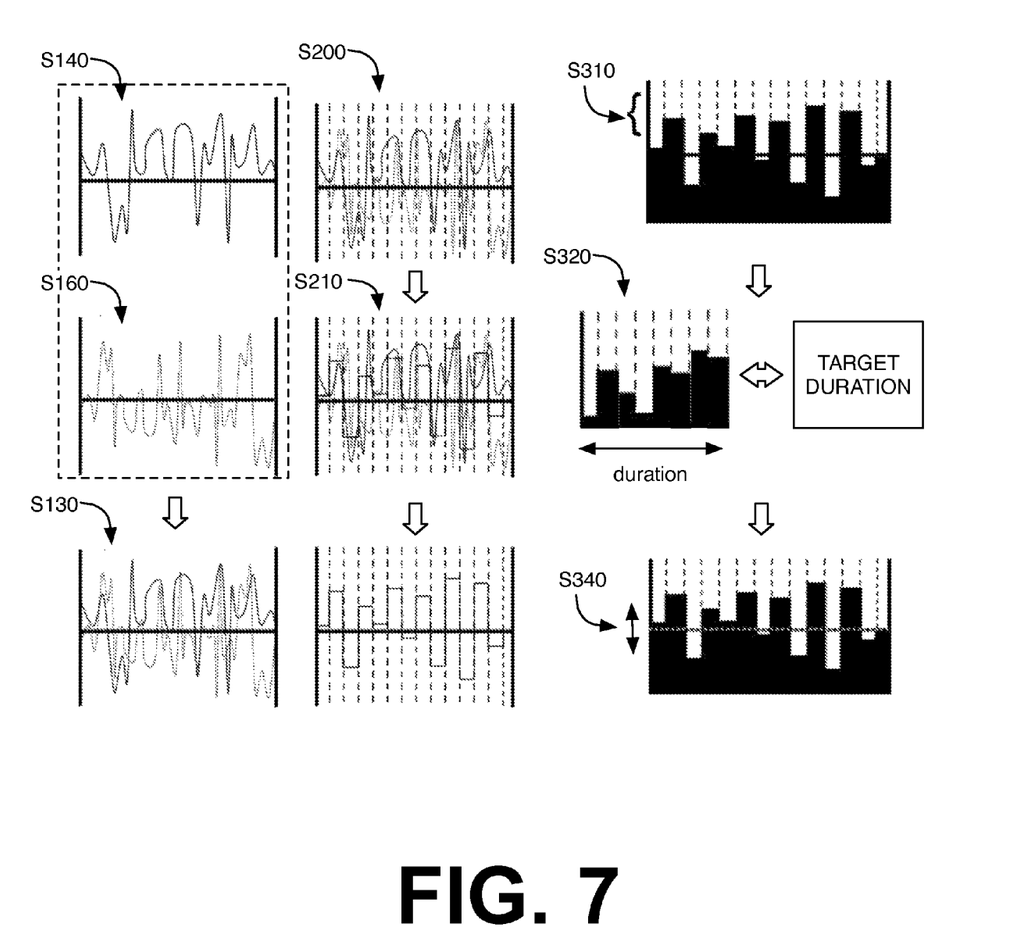
FIG. 7 is a schematic representation of a variation of determining parameter values for a plurality of frames within a piece of content, determining frame scores from the parameter values for each of the plurality of frames, grouping the frames into a plurality of frame groups, determining group scores for each of the plurality of frame groups, selecting the frame groups having a group score over a predetermined score threshold, comparing a collective parameter of the selected frame groups with a target parameter, and adjusting the score threshold and reselecting the frame groups until the collective parameter of the selected frame groups substantially meets the target parameter.

As shown in FIG. 1, grouping the frames into frame groups S200 functions to segment the content into scenes. Scene segmentation is preferably used when the content is video, but can be used for other types of content, such as images, wherein an image can be treated as a frame. Each frame is preferably associated with a frame interval. The frame interval can be determined by the content (e.g., each video frame is associated with a given interval, or time of play), or can be assigned an interval (e.g., each image, such as a photograph, is assigned a given interval, such as 3 seconds). Frame groups are preferably formed from adjacent frames, but can alternatively skip frames. Each frame group (scene, content segment) within a given piece of content preferably has a different duration, but can alternatively have the same duration. The frames can be grouped at predetermined intervals (e.g., grouped at 0.5 second intervals), grouped using clustering techniques based on the frame scores (e.g., greedy clustering), grouped according to continuous audio patterns (e.g., all frames associated with a continuous sentence are grouped into a scene), grouped using graph-based methods, or grouped in any other suitable manner. In one variation of the method, contiguous frames are grouped into shots using a greedy clustering technique in a non-Euclidean metric space of individual frames. The shots are then merged into scenes using hierarchical clustering, wherein the hierarchy is established using a similarity metric based on the distance between frames (e.g., timestamp difference between frames) and/or the distance between shots. In another variation of the method as shown in FIG. 7, the frames are grouped as a moving average is calculated, wherein the frame groups are the groups determined by the window size. The window size is preferably larger than the duration of a single frame (e.g., encompasses at least 2 frames), but can alternatively be any suitable size. The moving average step size is preferably equal to the window size, but can alternatively be larger or smaller. In another variation of the method, the frames are grouped according to similarity with adjacent frames. More preferably, contiguous frames are grouped according to score, wherein adjacent frames having a frame score above a score threshold are grouped together, and adjacent frames having a frame score below the score threshold are grouped together. Alternatively, as shown in FIG. 6, a group of frames can include frames having a frame score below the score threshold, wherein the number of contiguous frames having a frame score below the score threshold is preferably below an inclusion threshold. The inclusion threshold can dynamically vary based on the number of preceding and/or succeeding frames having frame scores above the score threshold. Thus, low scoring frames can be included in a high-scoring frame group. Likewise, solo or a low number of frames having scores above the score threshold can be excluded when surrounded by low-scoring frames. In another variation of the method, the frames are grouped using graph-based methods, wherein the score of each frame is represented as a node on a graph. The content is then cut into frame groups based on the similarity between nodes. For example, the length of the lines connecting adjacent nodes are considered inversely correlated with the similarity of the frames, wherein the frame group boundaries are defined along lines longer than a length threshold (e.g., predetermined or determined based on the adjacent line lengths). In another example, the frame group boundaries can be defined along lines having a steeper slope than a slope threshold. In another variation, the frame groups are clustered according to metadata associated with the frame. For example, contiguous frames having the same or similar timestamp and/or geographic location associated with the frame are preferably grouped together. However, the frame groups can be otherwise determined.

Grouping frames into frame groups can additionally include calculating a group score for each frame group S210, which functions to assign a score to each scene (as shown in FIG. 2). The group score is preferably determined from the frame scores, but can alternatively be determined in any other suitable manner. The group score can be determined from an average of the frame scores of the frames within the group, a weighted average of the constituent frame scores, a sum of the frame scores, or any other suitable calculation based on the frame scores.

Selecting frame groups to meet a target parameter S300 functions to select the content segments to be included in the multimedia file. The frame groups are preferably selected to meet a target parameter. Examples of target parameters include a target total length or duration, a target number or duration of each type of content, a target group score total, or any other suitable target parameter. The value for the target parameter can be a default value (e.g., a multimedia file length of 30 seconds), a user-selected value, a value determined from historical use data, or any other suitable target value. The frame groups selected for inclusion in the multimedia file preferably have a group score over a score threshold. However, frames can be selected based on an assigned rank (e.g., wherein the rank is determined based on the score), or selected in any other suitable manner. As shown in FIG. 2, the selected frame groups can be further grouped into scenes S301, wherein the scenes can be subsequently ranked based on the group score and selected for inclusion in the final multimedia file S302.

In one variation of the method, frame groups having a group score above a predetermined threshold are all selected to be included in the multimedia file.

In another variation of the method, the frame groups are ranked according to the respective group scores, wherein frame groups are included in the multimedia file according to rank (e.g., with the highest first, etc.) until a stop condition (e.g., a target parameter) is met.

In another variation of the method, the frame groups having a length shorter than a minimum segment length are excluded from consideration. The minimum segment length can vary according to the type of content. For example, the minimum segment length can be three frames or 0.5 seconds for video content, but can be a single frame or 3 seconds for image content (e.g., a photograph or graphic image). The minimum segment length can be automatically determined (e.g., set at 10 frames) or can be determined by the user.

In another variation of the method, a content type can be preferentially selected over other types of content. The preferred content type can be determined by the user or automatically determined by the service (e.g., as a predetermined setting, from historical user preferences, etc.). In this variation of the method, the frame score can additionally include a variable for the content type. Alternatively, the frame score or group score can be weighted or adjusted based on a multiplier for the content type. The number of each content type, percentage of the multimedia file length that each content type occupies, or any other parameter can additionally be determined by the user or automatically determined by the service. For example, the user can specify a target number of photographs that should be included in the video, wherein photographs are preferentially selected over other types of content for inclusion in the video until the target number of photographs is selected.

In another variation of the method as shown in FIG. 7, the frame groups having a group score above the score threshold are selected S310, a parameter of the frame group combination is compared to a target parameter S320, and the score threshold is adjusted until the parameter of the combined frame groups substantially meets the target parameter S340. For example, the final frame groups to be included in the multimedia file can be selected by selecting the frame groups having a group score over the score threshold, comparing the total length (duration) of the selected frame groups to a target length, and adjusting the score threshold until the total length of the selected frame groups substantially matches the target length.

In another variation of the method, frame group combinations are selected to meet a target parameter, and a combination is selected based on the frame scores. For example, selecting frame groups can include determining different combinations of frame groups that have a total length substantially equivalent to the target length, then selecting the combination of frame groups that has the highest summation of group scores.

In another variation of the method, frame groups are selected regardless of the associated group score until the target parameter has been met. The scores of subsequent frame groups are then compared to the group scores of the selected frame groups, wherein the subsequent frame group is selected when the associated group score is higher than the group score of a selected frame group. The frame group having the lowest group score is then deselected. This variation can be preferred when the content is streamed content, wherein the frame groups are dynamically determined from the buffered content.

As shown in FIG. 1, combining the selected frame groups into a multimedia file S400 functions to compile a video from the scenes, frames, or other content segments that are deemed the most interesting. The selected frame groups are preferably ordered within the multimedia file according to chronological order, but can alternatively be ordered by decreasing group score (e.g., the frame group with the highest group score is arranged first), arranged using a weighted calculation for the frame group ranking based on the original chronological order and group score, or ordered in any other suitable manner. The chronological order is preferably determined from the order in which the frame groups appear in the original content, but can alternatively be determined from timestamps associated with the frame groups or determined in any other suitable manner. The frame groups can be directly cut together, or transitions can be inserted between frame groups.

The method can additionally include receiving content from content storage S110, as shown in FIG. 2. The content is preferably received prior to frame score determination. The content is preferably received by the device or system performing the method. For example, the content can be received by a networked server, a user device, or any other suitable processing device. The content storage is preferably a remote storage device, such as a server belonging to a separate service (e.g., social networking service), but can alternatively be a storage device or structure collocated with the service (e.g., the content is stored on the device performing the method). The content is preferably received in response to a request sent to a processor controlling the content storage. The content can be downloaded to the processing device performing the method, streamed to the processing device, retrieved from the processing device, or otherwise received by the processing device. The audio and video data is preferably extracted from the received content S112, but metadata or any other suitable data can additionally or alternatively be extracted.

The method can additionally include receiving user input. The user input can function to trigger content retrieval and subsequent multimedia file generation. Content retrieval and multimedia file generation can be initiated upon receipt of selection of an icon or keystroke (e.g., selection of a "done" icon, return key selection, etc.). The user input can additionally determine the content from which the multimedia file is generated, wherein the user input is preferably a selection of the one or more pieces of content to be included (e.g., a user selection of a representation, more preferably graphical representation, of a piece of content). The user input can additionally determine the source from which the content should be retrieved, wherein the system automatically retrieves content relevant to the user from the source. In one variation of the method, the user input can be a user selection of the content source. In another variation of the method, the historical user input, preferences input by the user, or any other suitable user input can be used to automatically determine which source(s) to retrieve content from. For example, the default content source can be the pre-set content source or the content source that the user historically selects. The user input can additionally determine the weights applied to the frame score calculation, group score calculation, or content score calculation. In one variation of the method, a theme selection is received from a user, wherein predetermined parameter weights are assigned based on the theme. For example, the "sports" theme can be assigned to a set of parameter weights that gives a ball-like object and object motion more weight. In another variation of the method, a subject selection is received from the user, wherein the parameter can be included as a variable in the score calculation and/or the weight of the subject score can be increased. For example, when the selected subject is an identifier of a social network connection (e.g., account) that is connected to the user account through a social networking service, the weight for the selected subject score can be increased. The user input can additionally determine desired multimedia file characteristics or parameter. The user input can be a multimedia file length (duration) selection, a transition selection (e.g., transitions between frame groups), an overlaid music selection, or any other suitable multimedia file parameter selection.

The method can additionally include determining a video generation event, which functions to initiate content retrieval and subsequent multimedia file generation. The video generation event can be the receipt of a user input, the satisfaction of a generation condition, or any other suitable event. The generation condition can be set by the user, be a predetermined condition, be learned from user habits, or determined in any other suitable manner. Examples of the generation condition can include a social networking service connection posting a video beyond a threshold length, or a threshold number of images being uploaded within a predetermined period of time. An example of a generation condition learned from user habits can include determining that the user historically generates content after a major international event, wherein an event is qualified as a major international event based on the volume of content associated with the event, and automatically generating a multimedia file each time a major international event is detected. However, any other suitable generation condition can be detected.

The method can additionally include presenting the multimedia file to the user. Presenting the multimedia file (video) to the user can include sending the multimedia file to a user device associated with the user, displaying the video at the user device, posting or uploading the video to a content stream associated with an account of the user on a social networking service, or presenting the video in any other suitable manner.

The method can additionally include receiving a user response to the video. The user response is preferably received after the video is presented to the user. The user response can be a user action on the video, a user action with the video, or any other suitable response. A user action on the video can include reorganization of the frame group order within the video, substitution of a frame or frame group with another frame or frame group, a theme change, music change, transition change, addition of title frames, scene length change, video length change, or any other suitable video parameter change. A user action with the video can include posting or uploading the video to a content stream associated with an account of the user on a social networking service, sharing the video with a social networking service connection (e.g., sharing a link to the video), commenting on the video, or any other suitable action with the video. The user response is preferably stored locally on the device performing the method, but can alternatively be stored on a remote server. The user response is preferably stored in a user history associated with the user, but can be stored in a universal repository associated with a population of users.

The method can additionally include adjusting the parameters of subsequent video generation based on the user response. The historical user response to videos is preferably analyzed to extract user preferences. The parameters can be adjusted after the user response is repeatedly detected beyond an adjustment threshold. For example, parameter weights for a given theme or event type can be adjusted in response to frame group replacement by the user. In particular, the weights for highly scored parameters of the added frames can be increased while the weights for high-scoring parameters of the removed frames can be decreased. In another example, the order of the frame groups within the video can be adjusted based on the user response. In a specific example, the frame groups can be ordered according to chronological order by default, and ordered by decreasing importance if the user repeatedly reorders the frames of the generated videos in order of decreasing importance. In another example, user preferences for types of content can be extracted from the user response. In a specific example, if the user repeatedly moves images (e.g., pictures) to the end of the video, images can be weighted with less importance or can be automatically arranged at the end of subsequent videos.

The method can additionally include automatically selecting content with the system S500. This can be preferred when a large volume of content is being considered for the multimedia file. The content is preferably filtered prior to frame scoring, grouping, and selection according to one or more file parameters until a threshold number of considered content pieces is reached. Alternatively, the multiple pieces of content can be ranked based on the one or more file parameters. The file parameters that are considered can include metadata associated with the file, the author of the content, the length of the content, and/or any other suitable file parameter easily obtainable without analyzing the frames of the data. The metadata associated with the file can include location data, content-generating device data, time data, user-assigned tags, hosting service data, or any other suitable metadata.

Figure 8:
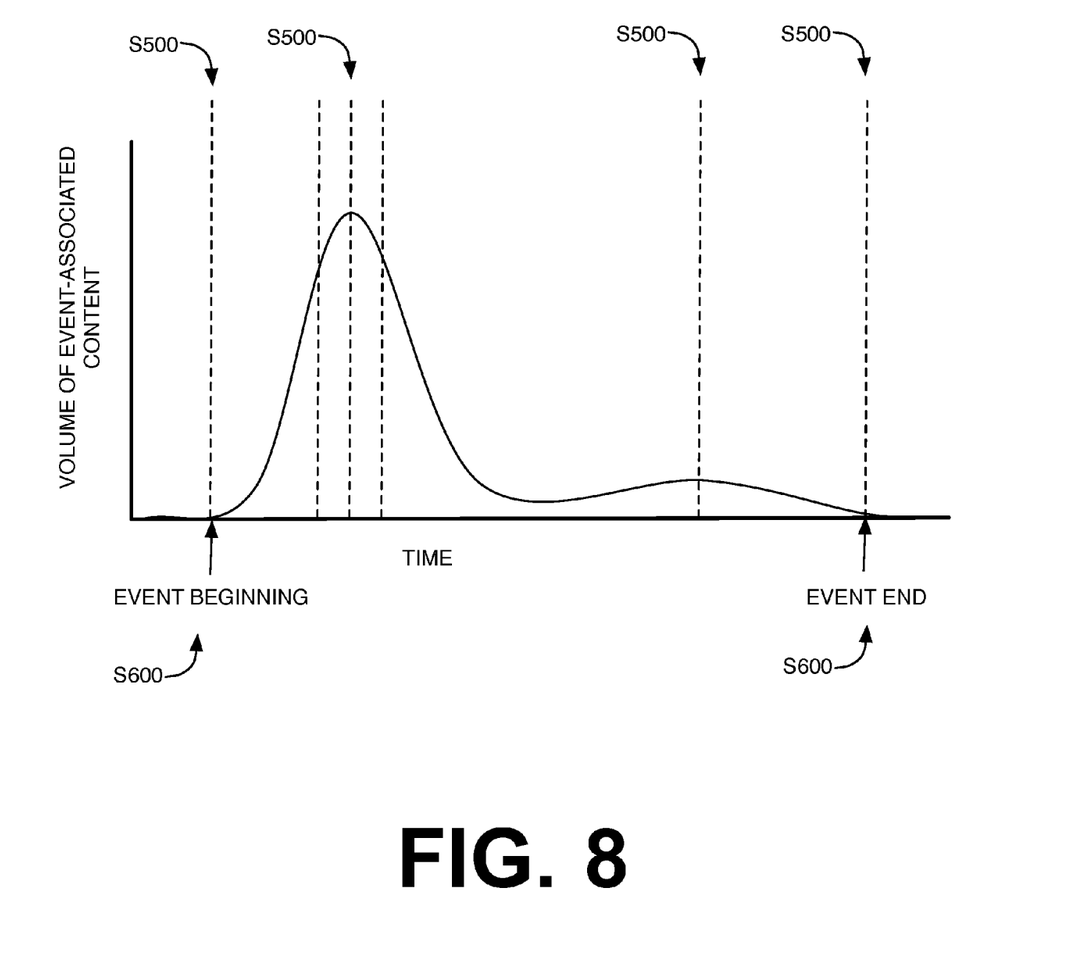
FIG. 8 is a schematic representation of determining the beginning and end timestamps of an event based on the generation frequencies of event-associated content and automatically selecting content based on the content generation frequencies.

The method can additionally include determining the beginning and end timestamps of the event from multiple pieces of content S600. The beginning and end timestamps are preferably absolute timestamps, but can alternatively be time codes or any other suitable time identifier. The beginning and end timestamps are preferably used to determine which intervening timestamps for which content or content segments should be selected. The content or content segments selected for the final video are preferably evenly distributed between the beginning and end timestamps. Alternatively, the selected content can have a skewed distribution (e.g., log-normal distribution), with more content selected from timestamps associated with high content generation volumes or frequencies, as shown in FIG. 8. However, the selected content can have any other suitable distribution along the event timeline. The beginning and end timestamps can be determined from a stored record (e.g., an event invitation on Facebook), from a user-input beginning and end timestamp, from generation patterns of content associated with the event, or determined in any other suitable manner. The beginning and end timestamps can be determined from the generation patterns of content associated with the event by determining the timestamps of the initial and final pieces of content that are tagged with the event, that include an audio signal matching an event audio signal footprint, that include a frame sequence matching an event frame sequence, that include or is tagged with text associated with the beginning or end of an event (e.g., as determined from hierarchical natural language processing), or that include any other suitable indicator of association with the event. Time thresholds can be used to determine content outliers, such that event-associated content that is generated before or after the event is not considered in the beginning and end timestamp determination.

The method can additionally include determining the event type (social register) of the event for one or more pieces of content. The event type is preferably used to determine which parameters should be considered for the frame score. The event type can additionally be used to determine the weights for the frame score parameters. The event type can be determined from a user selection, from a tag, from text recognition, from object recognition, from the timestamp and location tag, from shared metadata with content known to be associated with an event (e.g., tweets tagged with the event type), or using any other suitable method. For example, "birthday" can be assigned as the event type for a first piece of content when an audio pattern substantially similar to the "happy birthday song" is detected within the content. Other content having the same or similar timestamp and location tags as the first piece of content can also be assigned the event type of "birthday." Content generated by social network connections of the author of the first piece of content can additionally be assigned the event type of "birthday" if the same subjects (e.g., faces) are identified in both pieces of content.

The method can additionally include determining the event identifier from one or more pieces of content. The event identifier, or identifying characteristics of the event, is preferably used to identify, select, or filter for content associated with a particular event. The event identifier can be a tag, location data, timestamp data, a combination of the above, or any other suitable content parameter. The event identifier can additionally or alternatively be entered by a user, determined from a social networking service (e.g., an event name), or determined in any other suitable manner.

An alternative embodiment of the system preferably implements the above methods in a computer-readable medium storing computer-readable instructions. The instructions are preferably executed by computer-executable components preferably integrated with a content selection and compilation system. The content selection and compilation system can include a content scoring system and content selection system. The content selection and compilation system can additionally include a video frame scoring system and a video frame grouping system, wherein the content selection system selects frame groups for inclusion in the multimedia file. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for editing content, comprising:
   receiving image content comprising one of more frames from content storage with a system;
   calculating a content relevance score for each frame of the image content based on weighted parameter scores with the system;
   grouping frames into frame groups with the system;
   calculating a group content relevance score for each frame group based on the content relevance scores of the frames within the frame group with the system;
   selecting frame groups having a group content relevance score beyond a score threshold with the system;
   comparing a total length of the selected frame groups to a target length with the system;
   adjusting the score threshold until the total length of the selected frame groups substantially matches the target length with the system;
   combining the selected frame groups into a video with the system; and
   sending the video to a device with the system.

2. The method of claim 1, wherein receiving image content comprises receiving a plurality of image content, wherein selecting frame groups having a score beyond the threshold comprises selecting frame groups from the plurality of image content having a group score beyond the score threshold.

3. A method for editing content, comprising:
   receiving image content comprising one or more frames from content storage with a system;
   calculating a score for each frame of the image content based on weighted parameter scores with the system;
   grouping frames into groups with the system;
   calculating a group score for each frame group based on the scores of the frames within the frame group with the system;
   selecting frame groups having a group score beyond a score threshold with the system;
   comparing a total length of the selected frame groups to a target length with the system;
   adjusting the score threshold until the total length of the selected frame groups substantially matches the target length with the system;
   combining the selected frame groups into a video with the system: and
   sending the video to a device with the system, wherein receiving image content comprises retrieving an input video and a photograph.

4. A method for editing content, comprising:
   receiving image content comprising one or more frames from content storage with a system;
   calculating a score for each frame of the image content based on weighed parameter scores with the system;
   grouping frames into frame groups with the system;
   calculating a group score for each frame group based on the scores of the frames within the frame group with the system;
   selecting frame groups having a group score beyond a score threshold with the system;
   comparing a total length of the selected frame groups to a target length with the system;
   adjusting the score threshold until the total length of the selected frame groups substantially matches the target length with the system;
   combining the selected frame groups into a video with the system; and
   sending the video to a device with the system, wherein the input video and the photograph are retrieved in response to receiving a user selection of a representation of the input video and receiving a user selection of a representation of the photograph.

5. The method of claim 1, further comprising receiving a user input comprising a parameter selection and increasing the weighting for the selected parameter.

6. The method of claim 1, wherein calculating a score for each frame comprises calculating the score based on an image parameter.

7. The method of claim 6, wherein calculating a score based on an image parameter comprises calculating the score based on object recognition.

8. The method of claim 6, wherein calculating a score based on an image parameter comprises calculating the score based on a focus score.

9. The method of claim 1, wherein calculating a score for each frame comprises calculating the score based on an audio parameter.

10. A method for editing content, comprising:
    receiving image content comprising one or more frames from content storage with a system;
    calculating a score for each frame of the image content based on weighted parameter scores with the system, wherein calculating a score for each frame comprises calculating the score based on an audio parameter;
    grouping frames into frame groups with the system;
    calculating a group score for each frame group based on the scores of the frames within the frame group with the system;
    selecting frame groups having a group score beyond a score threshold with the system;
    comparing a total length of the selected frame groups to a target length with the system;
    adjusting the score threshold until the total length of the selected frame groups substantially matches the target length with the system;
    combining the selected frame groups into a video with the system; and
    sending the video to a device with the system, wherein calculating the score for each frame based on the audio parameter comprises:
    determining voice activity within an audio signal associated with the frame by comparing the audio signal associated with the frame with audio signals associated with frames preceding and succeeding the frame; and calculating the score based on the determined voice activity associated with the frame.

11. A method for editing content, comprising:

receiving image content comprising one or more frames from content storage with a system;

calculating a scare for each frame of the linage content based on weighted parameter scores with the system, wherein calculating a score for each frame comprises calculating the score based on an audio parameter;

grouping frames into frame groups with the system;

calculating a group score for each frame group based on the scores of the frames within the frame group with the system;

selecting frame groups having a group score beyond a score threshold with the system;

comparing a total length of the selected frame groups to a target length with the system;

adjusting the score threshold until the total length of the selected frame groups substantially matches the target length with the system;

combining the selected frame groups into a video with the system; and sending the video to a device with the system, wherein calculating the score based on the audio parameter comprises calculating the score based on an amplitude of an audio signal associated with the frame, relative to amplitudes of audio signals associated with preceding and succeeding frames.

12. The method of claim 1, wherein the group score is based on an average of the scores of the frames within the group.

13. A method for editing content, comprising:

receiving image content comprising one or more frames from content storage with a system;

calculating a score for each frame of the image content based on weighted parameter scores with the system;

grouping frames into frame groups with the system;

calculating a group score for each frame group based on an average of the scores of the frames within the frame group with the system;

selecting frame groups having a group score beyond a score threshold with the system;

comparing a total length of the selected frame groups to a target length with the system;

adjusting the score threshold until the total length of the selected frame groups substantially matches the target length with the system;

combining the selected frame groups into a video with the system; and sending the video to a device with the system, wherein grouping frames into frame groups with the service and calculating a group score for each frame group based on the scores of the frames within the frame group with the service is performed as part of a moving average calculation of the frame scores.

14. The method of claim 12, wherein each frame is associated with a frame interval, wherein the frames are grouped at predetermined intervals.

15. A method of video compilation, comprising:

receiving a plurality of image content, each piece of image content comprising one or more frames;

calculating a content relevance score for each frame of the image content based on weighted content parameters;

grouping frames into scenes for each piece of image content;

calculating a scene content relevance score for each scene based on the content relevance scores of the frames within the scene;

selecting scenes from the plurality of image content having scene content relevance scores beyond a score threshold;

in response to a total duration of the selected scenes exceeding a target duration, removing scenes having the lowest scene content relevance scores until the total duration of the selected scenes substantially matches the target duration; and combining the selected scenes in chronological order into a video.

16. The method of claim 15, wherein the plurality of image content comprises a still image and an input video.

17. A method of video compilation, comprising:

receiving a plurality of image content, each piece of image content comprising one or more frames;

calculating a score for each frame of the image content based on weighted content parameters;

grouping frames into scenes for each piece of image content;

calculating a scene score for each scene based an the scores of the frames within the scene;

selecting scenes from the plurality of image content having scene scores beyond a score threshold;

in response to a total duration of the selected scenes exceeding a target duration, removing scenes having the lowest scene scores until the total duration of the selected scenes substantially matches the target duration; and combining the selected scenes in chronological order into a video, wherein the content parameters comprise; a number of connections separating the user account from an author account for the image content, an image parameter, and an audio parameter.

18. A method of video compilation, comprising:

receiving a plurality of image content, each piece of image content comprising one or more frames;

calculating a score for each frame of the image content based on weighted content parameters;

grouping frames into scenes for each piece of image content;

calculating a scene score for each scene based on the scores of the frames within the scene;

selecting scenes from the plurality of image content having scene scores beyond a score threshold;

in response to a total duration of the selected scenes exceeding a target duration, removing scenes having the lowest scene scores until the total duration of the selected scenes substantially matches the target duration; and combining the selected scenes in chronological order into a video, wherein the content parameters comprise: a number of connections separating the user account from an author account for the image content, an image parameter, and an audio parameter, wherein the image parameter comprises a face parameter and the audio parameter comprises a voice activity parameter.

19. The method of claim 15, wherein grouping frames into scenes comprises grouping the frames into scenes having a predetermined duration.

20. The method of claim 19, wherein calculating the scene score comprises applying a moving average to the frames of each piece of image content.

* * * * *